Inventors
CYRIL T. PAQUETTE
AND LYNN B. WEBB
Attorneys

Inventors
CYRIL T. PAQUETTE
AND LYNN B. WEBB
Attorneys

Jan. 3, 1950 C. T. PAQUETTE ET AL 2,493,260
METHOD OF FEEDING GLASS

Filed Jan. 23, 1946 3 Sheets-Sheet 3

Inventors
CYRIL T. PAQUETTE
AND LYNN B. WEBB
By
Knight & Fowler.
Attorneys

Patented Jan. 3, 1950

2,493,260

UNITED STATES PATENT OFFICE 2,493,260

METHOD OF FEEDING GLASS

Cyril T. Paquette and Lynn B. Webb, Corning, N. Y., assignors to Corning Glass Works, Corning, N. Y., a corporation of New York Application January 23, 1946, Serial No. 642,904

3 Claims. (Cl. 49—77)

The present invention relates to a method of feeding glass from feeder bowls ordinarily supplied with molten glass by forehearths connecting them with suitable supply bodies and from which molten glass is withdrawn and formed into a desired product. In order to add to the homogeneity of the glass, it is common practice to employ a stirring implement in the bowl. When a bowl with a bottom outlet is employed, a rotating needle is usually employed. When the glass is drawn from the surface, a rotating sleeve is usually used. In either arrangement, glass supplied to the bowl usually contains surface contamination and some method of its removal is highly desirable.

The prime object of the present invention is improved methods of feeding glass from feeder bowls of the foregoing general character so designed as to keep surface glass away from the region of the bowl from which glass used in production of ware is withdrawn.

In the accompanying drawings

Figure 1:
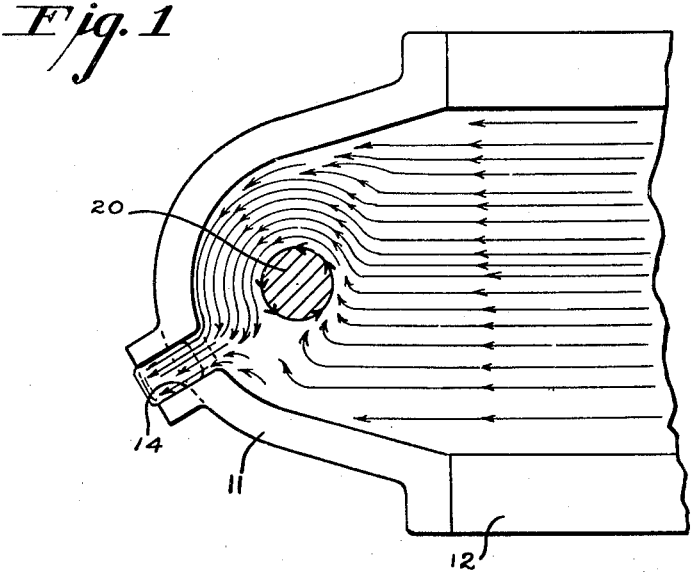
Fig. 1 is a plan view of a feeder bowl embodying the invention showing a sectional view of a feeder needle and a fragment of a connected forehearth.
Figure 2:
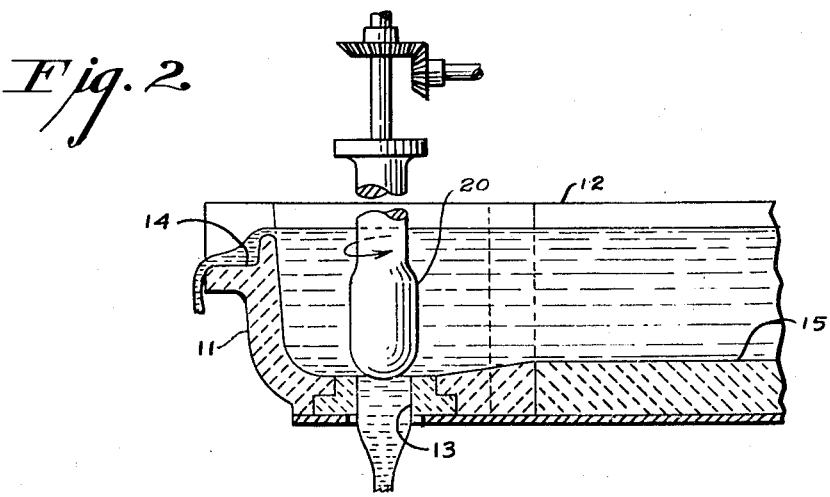
Fig. 2 is a sectional elevation of the structure of Fig. 1 showing the feeder needle and part of its drive mechanism arranged over the bowl outlet.

Referring now to Figs. 1 and 2, the structure comprises a feeder bowl 11 joined to a forehearth 12 for feeding molten glass thereto. Feeder bowl 11 has a bottom outlet 13 arranged in the central area thereof and an overflow trough 14 having its channel laterally disposed 30° from the center line of the forehearth channel 15. Stated otherwise, the overflow opening is angularly disposed with respect to the center line of the forehearth 210° measuring in the direction of rotation of the needle 20. The depth of trough 14 is such that with a normal operating level of glass in the bowl 11 sufficient glass flows out this trough to maintain that passing through the bottom outlet 13 free from contaminated surface glass.

As in conventional practice, a needle 20 is rotated slowly to improve the homogeneity of the glass passing to the bottom outlet 13. A rotating needle tends to move the surface glass along flow lines in spirals spaced somewhat from the needle, and accordingly glass from the upper level of the body surrounding the needle and drawn down the sides of the needle into glass about to pass through the bottom outlet is free from surface contamination. By rotating the needle 20 counterclockwise in a bowl having its overflow outlet located as shown, the flow lines are, for the most part, along paths in harmony with and therefore an aid to those existing when glass flows from the forehearth into the bowl 11. The greater percentage of surface glass accordingly passes about the needle and out trough 14. That surface glass which passes about needle 20 predominates over that tending to flow directly to the overflow trough 14 rather than around the needle. The net result is that some of the surface glass becomes submerged, but being nearer the overflow trough 14 than the bottom outlet 13 apparently also finds its way out of the overflow trough.

In the alternative form (Figs. 3 and 4), bowl 31 has its overflow trough 34 so located that its center line is 90° from the center line of the forehearth channel 35.

Figure 3:
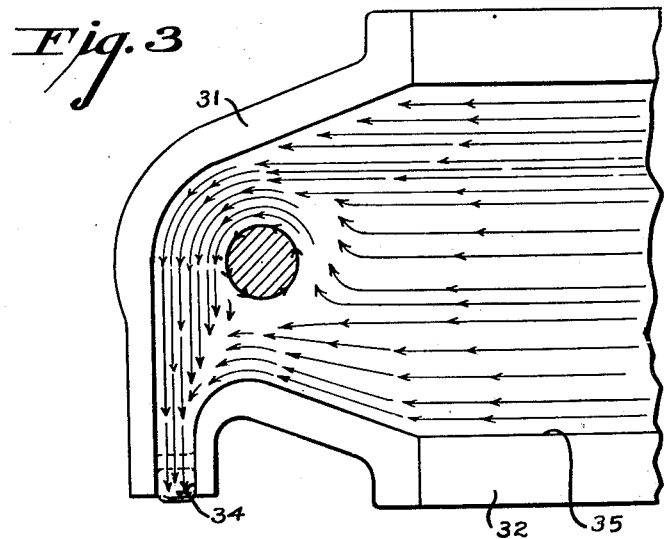
Fig. 3 is a plan view partly in section of an alternative form of feeder bowl and a fragment of a connected forehearth.
Figure 4:
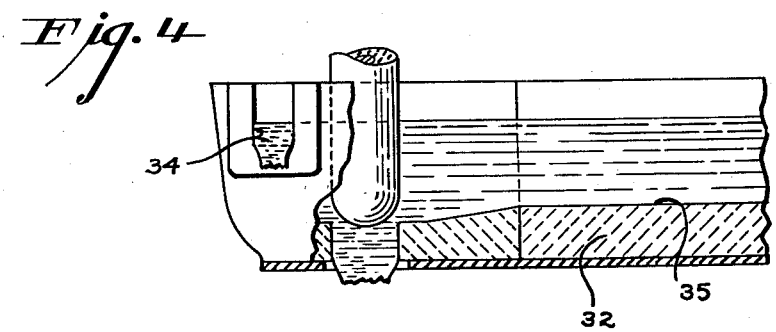
Fig. 4 is a sectional elevation of the structure of Fig. 3.

As indicated by the arrows in Figs. 1 and 3, the movement of the surface glass created by rotation of the needle is for the most part in directions in harmony with the general direction of movement of the stream as a whole into the bowl, and accordingly the flowing of a very small volume of glass out the overflow channel suffices to prevent an objectionable amount of such glass finding its way into the glass delivery outlet.

Either bowl 11 or 31 has been found far more effective in the satisfactory removal of surface glass than when the overflow channel is arranged in alignment with the forehearth channel.

Figure 5:
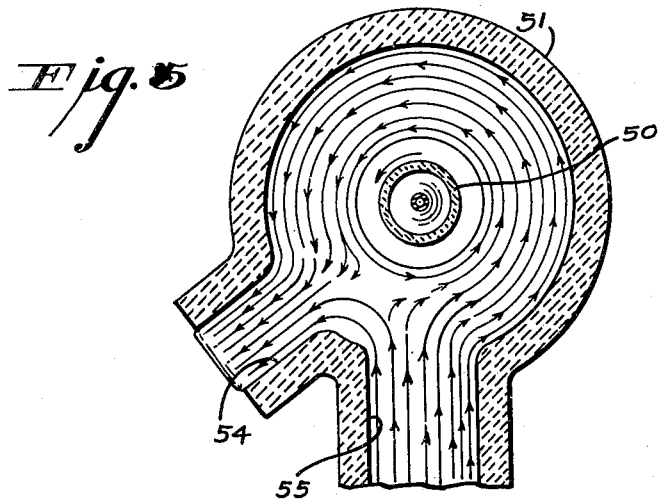
Fig. 5 is a sectional plan view of an up-draw bowl embodying the invention.
Figure 6:
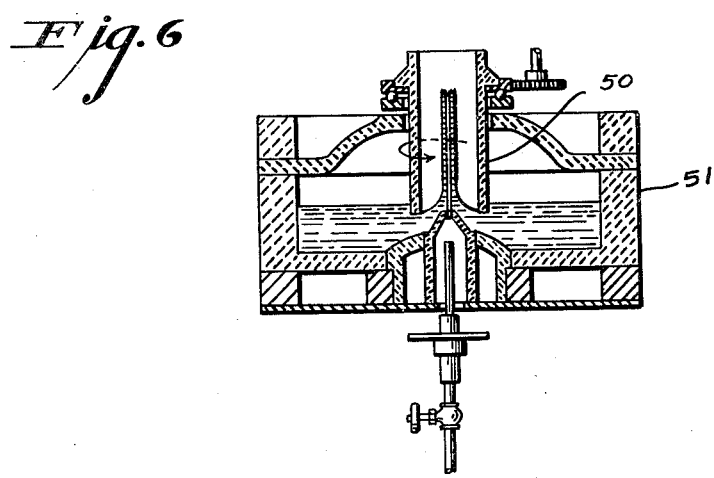
Fig. 6 is a sectional elevation of the structure of Fig. 5 showing portions of the structure not shown in Fig. 5.

In the application of the invention to an up-draw bowl 51 (Fig. 5) equipped with a rotating sleeve 50, the overflow channel 54 has been found most efficient when its center line is angularly disposed 150° from the center line of the feed channel 55. The sleeve 50 when slowly rotated in a counter clockwise direction, as indicated, aids in the movement of most of the surface glass around the sleeve and out the overflow channel 54. As in the feeder bowls 11 and 31, that surface glass which becomes submerged as it flows from channel 55 directly toward channel 54 is drawn into the stream of surface glass issuing from channel 54.

Although the bowls of the disclosure show troughs with their center lines 30°, 90°, and 150°, respectively, from the center line of the forehearth channel, or 210°, 270° and 330° measuring in the direction of rotation, it should be understood that the invention also contemplates positioning the trough at other angles with respect to the center line of the forehearth.

We claim:

1. The method of diverting contaminated surface glass away from an area of a pool from which glass is being withdrawn for formation into ware, which includes the steps of flowing glass into the pool to replace glass withdrawn therefrom, augmenting and laterally directing the movement of surface glass resulting from the flow of glass into the pool by rotating an implement in the pool, withdrawing glass from an area of the pool coextensive with the axis of rotation of the implement, and overflowing surface glass from the pool at a point along the edge thereof arcuately displaced from the point of introduction of the glass into said pool more than 180° measured in the direction of rotation of said implement.

2. A method such as defined by claim 1 in which the glass is withdrawn from the top surface of the pool and the area of withdrawal is shielded from the remaining top surface area.

3. A method such as defined by claim 1 in which the glass is withdrawn from the pool immediately below the axis of rotation of said implement.

CYRIL T. PAQUETTE.
LYNN B. WEBB.

REFERENCES CITED

The following references are of record in the file of this patent:

UNITED STATES PATENTS

| Number | Name | Date |
|---|---|---|
| 1,737,525 | Soubier | Nov. 26, 1929 |
| 2,036,872 | Honiss | Apr. 7, 1936 |
| 2,050,205 | Bailey | Aug. 4, 1936 |
| 2,063,842 | Honiss | Dec. 8, 1936 |
| 2,085,245 | Woods | June 29, 1937 |